United States Patent
Goslin et al.

(10) Patent No.: US 11,501,498 B2
(45) Date of Patent: Nov. 15, 2022

(54) AUGMENTED REALITY IMAGE GENERATION

(71) Applicant: Disney Enterprises, Inc., Burbank, CA (US)

(72) Inventors: Michael P. Goslin, Sherman Oaks, CA (US); Steven M. Chapman, Newbury Park, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 440 days.

(21) Appl. No.: 15/974,604

(22) Filed: May 8, 2018

(65) Prior Publication Data
US 2019/0347855 A1 Nov. 14, 2019

(51) Int. Cl.
*G06T 5/50* (2006.01)
*G06T 19/00* (2011.01)
*G06T 7/73* (2017.01)

(52) U.S. Cl.
CPC .............. *G06T 19/006* (2013.01); *G06T 5/50* (2013.01); *G06T 7/74* (2017.01); *G06T 2207/20221* (2013.01)

(58) Field of Classification Search
CPC ............ G06T 19/006; G06T 7/74; G06T 5/50
USPC ........................................................ 345/633
See application file for complete search history.

(56) References Cited

U.S. PATENT DOCUMENTS

| 2011/0216179 A1* | 9/2011 | Dialameh | A61H 3/061 348/62 |
| 2015/0130790 A1* | 5/2015 | Vasquez, II | G06T 19/006 345/419 |
| 2017/0256097 A1* | 9/2017 | Finn | G06T 7/73 |
| 2018/0336729 A1* | 11/2018 | Prideaux-Ghee | G06F 3/011 |

OTHER PUBLICATIONS

Author unknown, "Video Stabilization Using Point Feature Matching", archived Nov. 21, 2015 from https://www.mathworks.com/help/vision/examples/video-stabilization-using-point-feature-matching.html.*

* cited by examiner

*Primary Examiner* — Hai Tao Sun
(74) *Attorney, Agent, or Firm* — Farjami & Farjami LLP

(57) ABSTRACT

According to one implementation, an augmented reality image generation system includes a display, and a computing platform having a hardware processor and a system memory storing a software code. The hardware processor executes the software code to receive a camera image depicting one or more real-world object(s), and to identify one or more reference point(s) corresponding to the camera image, each of the reference point(s) having a predetermined real-world location. The software code further maps the real-world object(s) to their respective real-world location(s) based on the predetermined real-world location(s) of the reference point(s), merges the camera image with a virtual object to generate an augmented reality image including the real-world object(s) and the virtual object, and renders the augmented reality image on the display. The location of the virtual object in the augmented reality image is determined based on the real-world location(s) of the real-world object(s).

20 Claims, 4 Drawing Sheets

AUGMENTED REALITY IMAGE GENERATION

BACKGROUND

Augmented reality (AR) and virtual reality (VR) experiences may merge virtual objects or characters with real-world features in a way that can, in principle, provide a powerfully interactive experience to a user. AR can augment "real-reality", i.e., a user can see the real world through clear lenses with virtual projections on top. VR can augment a virtual rendition of real-reality, where the view of the real-world comes from a headset mounted camera that are projected into VR space, so a user still sees the real world around them.

SUMMARY

There are provided systems and methods for performing augmented reality image generation, substantially as shown in and/or described in connection with at least one of the figures, and as set forth more completely in the claims.

DETAILED DESCRIPTION

One limitation associated with conventional approaches to generating augmented reality (AR) and virtual reality (VR) imagery is accurate identification of the real-world locations of the real-world objects captured by a camera. As result, when imagery captured by such a camera is merged with a virtual object, the virtual object may be inappropriately located within the real-world environment. For example, a virtual object such as an avatar or character may be placed partially through a wall or floor of a real-world environment, thereby significantly reducing the apparent realism of the AR or VR scene to the user.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
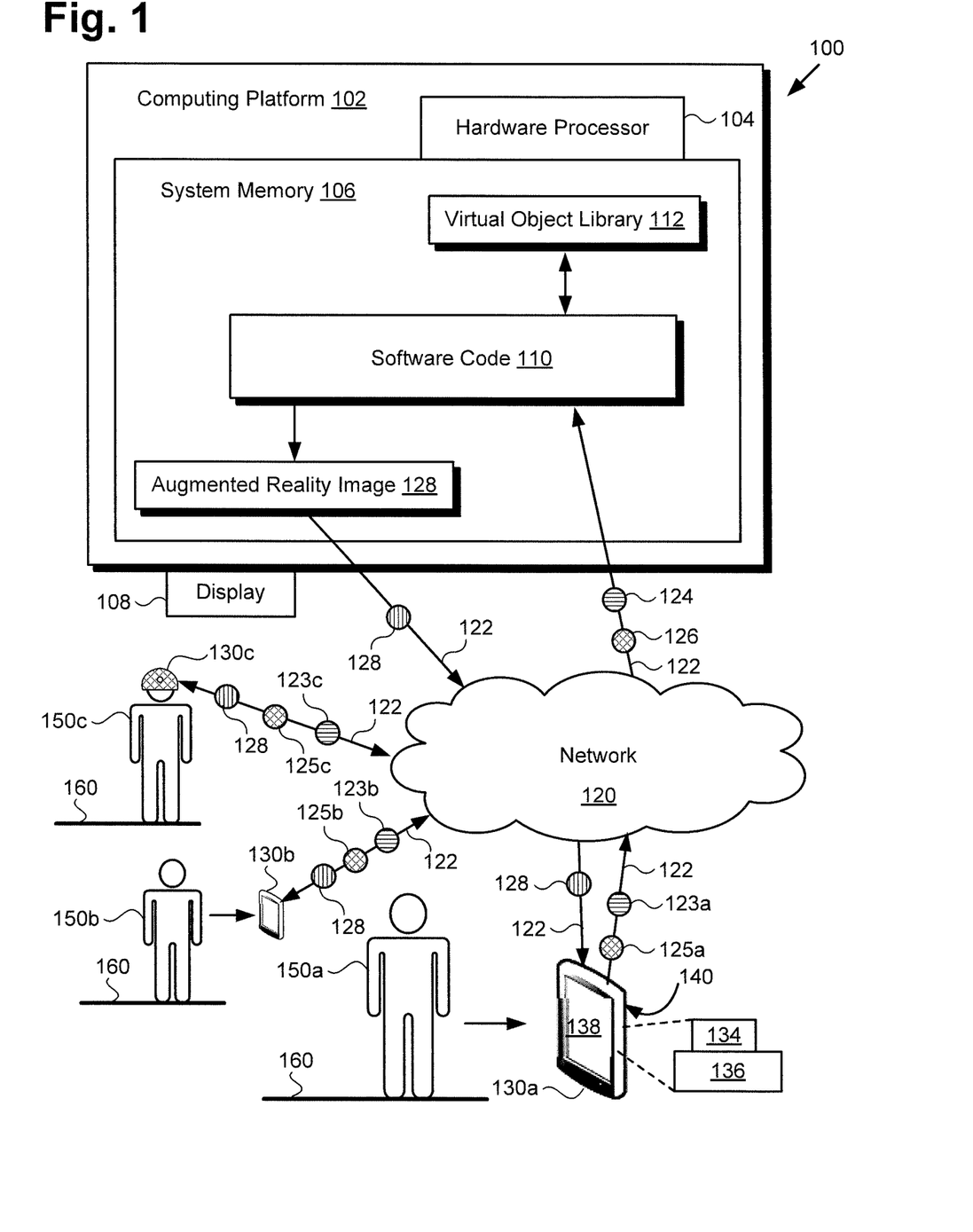
FIG. 1 shows a diagram of an exemplary system for performing augmented reality image generation, according to one implementation.

FIG. 1 shows a diagram of an exemplary system for performing augmented reality image generation, according to one implementation. As shown in FIG. 1, augmented reality image generation system 100 includes computing platform 102 having hardware processor 104, system memory 106 implemented as a non-transitory storage device, and display 108, which may be integrated with computing platform 102 or may be merely communicatively coupled to computing platform 102.

According to the present exemplary implementation, system memory 106 stores software code 110 and virtual object library 112, and may store augmented reality image 128. As used herein, "augmented reality image" refers to an image composed of one or more real-world objects and one or more virtual objects or affects, and may be incorporated as part of an AR user experience or a VR user experience. Also, "virtual object" refers to simulations of persons, avatars, characters, caricatures of persons, animals, plants, and living things of various species or varieties, as well as inanimate objects. As further used herein, a "real-world object" is an animate entity or inanimate object that actually exists, i.e., has objectively verifiable physical extension and presence in space.

As further shown in FIG. 1, augmented reality image generation system 100 is implemented within a use environment including communication network 120 and one or more mobile user systems 130a, 130b, and/or 130c (hereinafter "mobile user system(s) 130a, 130b, and/or 130c"). Each of mobile user system(s) 130a, 130b, and/or 130c includes a hardware processor corresponding to user system hardware processor 134, a memory corresponding to user system memory 136, a display corresponding to display 138, and a camera corresponding to camera 140. In addition, and as shown in FIG. 1, mobile user system(s) 130a, 130b, and/or 130c are utilized by respective one or more users 150a, 150b, and/or 150c (hereinafter "user(s) 150a, 150b, and/or 150c") at user venue 160.

Also shown in FIG. 1 are network communication links 122 interactively connecting mobile user system(s) 130a, 130b, and/or 130c and augmented reality image generation system 100 via communication network 120, as well as camera image data 123a, 123b, and 123c, camera image 124, optional sensor data 125a, 125b, and 125c, and optional aggregated sensor data 126. It is noted that camera image 124 may include any or all of camera image data 123a, 123b, and 123c. That is to say, in a use case in which only user 150a utilizing mobile user system 130a is present at user venue 160, camera image 124 may include only camera image data 123a. However, in use cases in which one or both of users 150a and 150b are also present at user venue 160, camera image 124 may include one or both of camera image data 123b and 123c, in addition to camera image data 123a.

With respect to aggregated sensor data 126, by analogy, aggregated sensor data 126 may include any or all of sensor data 125a, 125b, and 125c. That is to say, in a use case in which only user 150a utilizing mobile user system 130a is present at user venue 160, aggregated sensor data 126 may include only sensor data 125a. However, in use cases in which one or both of users 150a and 150b are also present at user venue 160, aggregated sensor data 126 may include one or both of sensor data 125b and 125c, in addition to sensor data 125a.

It is further noted that display 108 of augmented reality image generation system 100, as well as display 138 corresponding to mobile user system(s) 130a, 130b, and/or 130c, may be implemented as a liquid crystal display (LCD), a light-emitting diode (LED) display, an organic light-emitting diode (OLED) display, or another suitable display screen that performs a physical transformation of signals to light. It is also noted that, although the present application refers to software code 110 as being stored in system memory 106 for conceptual clarity, more generally, system memory 106 may take the form of any computer-readable non-transitory storage medium.

The expression "computer-readable non-transitory storage medium," as used in the present application, refers to any medium, excluding a carrier wave or other transitory signal that provides instructions to hardware processor 104 of computing platform 102, or to user system hardware processor 134 corresponding to mobile user system(s) 130a, 130b, and 130c. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 1 depicts software code 110 and virtual object library 112 as being co-located in system memory 106, that representation is also provided merely as an aid to conceptual clarity. More generally, augmented reality image generation system 100 may include one or more computing platforms 102, such as computer servers for example, which may form an interactively linked but distributed system, such as a cloud based system, for instance. As a result, hardware processor 104 and system memory 106 may correspond to distributed processor and memory resources within augmented reality image generation system 100.

According to the implementation shown by FIG. 1, user(s) 150(a), 150(b), and/or 150(c) may utilize respective mobile user system(s) 130a, 130b, and/or 130c to interact with augmented reality image generation system 100 over communication network 120. In one such implementation, augmented reality image generation system 100 may correspond to one or more web servers, accessible over a packet-switched network such as the Internet, for example. Alternatively, augmented reality image generation system 100 may correspond to one or more computer servers supporting a local area network (LAN), or included in another type of limited distribution network.

In some implementations, user venue 160 may include an indoor environment. Examples of such indoor environments include an enclosed sports arena or shopping mall, a hotel, a casino, or a museum, to name a few. Alternatively, in some implementations, user venue 160 may include an outdoor environment. Examples of such outdoor environments include a pedestrian shopping and/or dining district, an open air sports arena or shopping mall, a resort property, and a park, again to name merely a few.

Although mobile user system 130a, for example, is depicted as having a form factor corresponding to a smartphone or tablet computer, in FIG. 1, that representation is also provided merely as an example. More generally, mobile user system(s) 130a, 130b, and/or 130c may be any suitable mobile device or system that implements data processing capabilities sufficient to provide a user interface, support connections to communication network 120, and implement the image capture and optional sensing functionality ascribed to mobile user system(s) 130a, 130b, and/or 130c herein. For instance, and as represented by mobile user system 130c, in some implementations, some or all of mobile user system(s) 130a, 130b, and/or 130c may take the form of a head-mounted viewing device such as an AR or VR viewer.

User(s) 150a, 150b, and/or 150c may utilize respective mobile user system(s) 130a, 130b, and/or 130c to interact with augmented reality image generation system 100 to use software code 110, executed by hardware processor 104, to produce augmented reality image 128 based on camera image 124, and, in some implementations, optional aggregated sensor data 126 as well. For example, in some implementations, augmented reality image generation system 100 may receive optional aggregated sensor data 126 including sensor data 125a, 124b, and 125c, and/or camera image 124 including camera image data 123a, 123b, and 123c from respective mobile user system(s) 130a, 130b, and 130c.

Camera image data 123a, 123b, and 123c may correspond to camera images of user venue 160 captured by camera 140 corresponding to mobile user systems 130a, 130b, and 130c from the different perspectives of respective users 150a, 150b, and 150c. In some implementations, hardware processor 104 may be configured to execute software code 110 to effectively "stitch together" camera image data 123a, 123b, and 123c to form a spatial map, such as a three-hundred-and-sixty (360°) map of user venue 160 for use in generating augmented reality image 128.

Sensor data 125a, 125b, and 125c may include various types of sensor data, such as depth sensor data, accelerometer data, Global Positioning System (GPS) data, and/or magnetometer data, to name a few examples, obtained at the different locations of users 150a, 150b, and 150c in user venue 160. In some implementations, hardware processor 104 may be configured to execute software code 110 to form the spatial map of user venue 160 for use in generating augmented reality image 128 based on sensor data 125a, 125b, and 125c, in addition to camera image data 123a, 123b, and 123c. It is noted that aggregated sensor data 126 including one or more of sensor data 125a, 125b, and/or 125c will hereinafter be referred to simply as "sensor data 126."

It is noted that, in various implementations, augmented reality image 128, when generated using software code 110, may be stored in system memory 106 and/or may be copied to non-volatile storage. Alternatively, or in addition, as shown in FIG. 1, in some implementations, augmented reality image 128 may be sent to mobile user system(s) 130a, 130b, and/or 130c including display 138, for example by being transferred via network communication links 122 of communication network 120.

In some implementations, software code 110 may be utilized directly by mobile user system(s) 130a, 130b, and/or 130c. For example, software code 110 may be transferred to user system memory 136 corresponding to mobile user system(s) 130a, 130b, and/or 130c, via download over communication system 122, for example, or via transfer using a computer-readable non-transitory medium, such as an optical disc or FLASH drive. In those implementations, software code 110 may be persistently stored on user system memory 136, and may be executed locally on mobile user system(s) 130a, 130b, and/or 130c by user system hardware processor 134.

Figure 2:
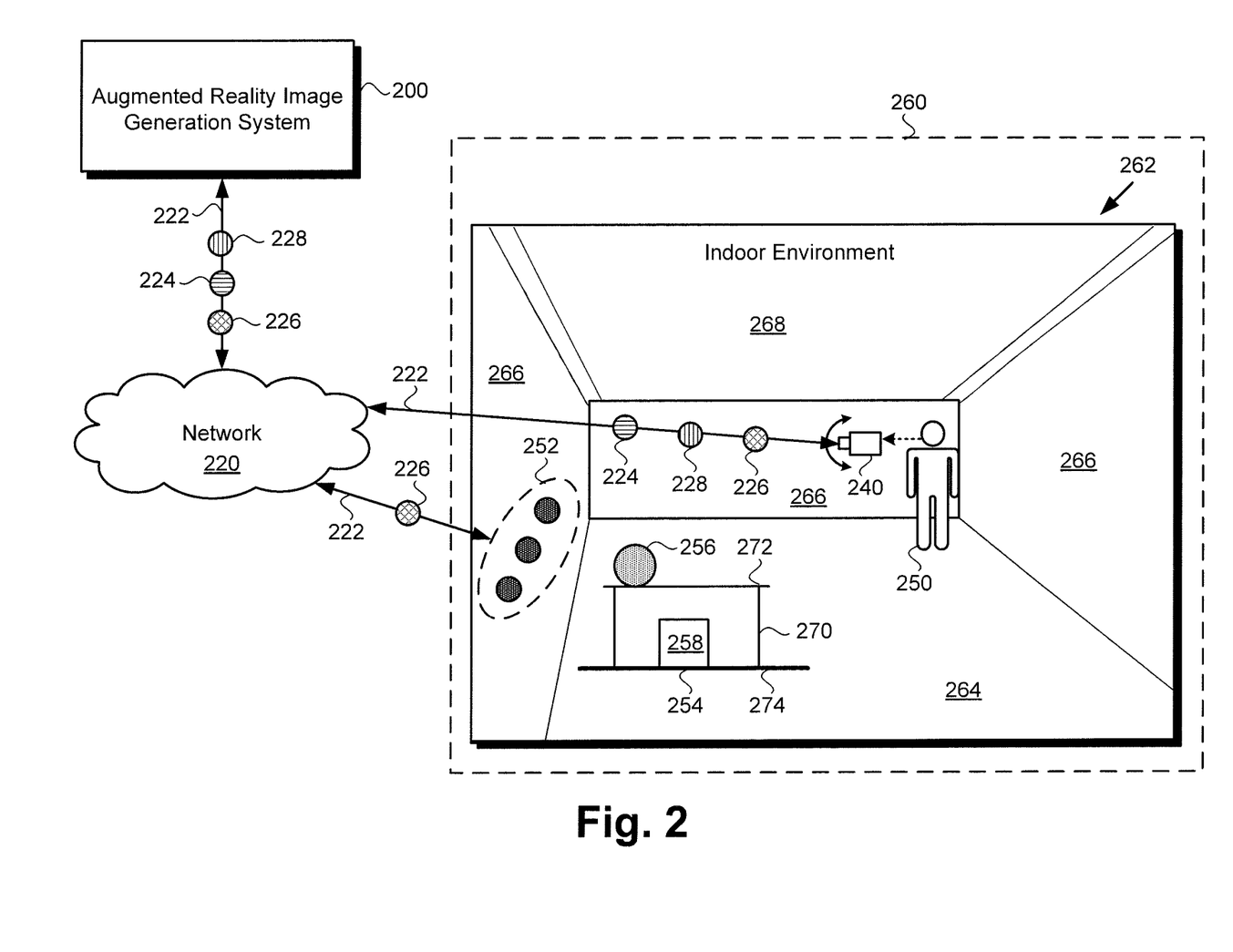
FIG. 2 shows a diagram of an exemplary user venue utilized in augmented reality image generation, according to one implementation.

FIG. 2 shows a diagram of exemplary user venue 260 utilized in augmented reality image generation, according to one implementation. As shown in FIG. 2, user venue 260 is implemented as part of a use environment including camera 240 utilized by user 250, communication network 220, augmented reality image generation system 200, and one or more optional sensors 252 (hereinafter "sensor(s) 252"). Sensor(s) 252 may include one or more of depth sensors, accelerometers, GPS receivers, and/or magnetometers, to name a few examples. Also shown in FIG. 2 are network communication links 222 interactively connecting camera 240 and optional sensors 252 of user venue 260 with augmented reality image generation system 200 via communication network 220, as well as camera image 224, optional sensor data 226, and augmented reality image 228.

As further shown in FIG. 2, user venue 260 includes indoor environment 262 that in turn includes multiple real-world objects such as floor 264, walls 266, and ceiling 268, as well as one or more items of furniture represented by exemplary table 270 having surface 272. FIG. 2 also shows real-world location 274 of table 270 (hereinafter "real-world object 270"), virtual object 256, and one or more reference point(s) 258 having respective predetermined real-world location(s) 254.

Augmented reality image generation system 200, communication network 220, and network communication links 222 correspond respectively in general to augmented reality image generation system 100, communication network 120, and network communication links 122, in FIG. 1, and those corresponding features may share any of the characteristics attributed to either corresponding feature by the present disclosure. Thus, although not shown in FIG. 2, augmented reality image generation system 200 includes features corresponding to computing platform 102, hardware processor 104, system memory 106 storing software code 110 and virtual object library 112, and display 108.

In addition, camera image 224, optional sensor data 226, and augmented reality image 228, in FIG. 2, correspond respectively in general to camera image 124, optional sensor data 126, and augmented reality image 128, in FIG. 1, and those corresponding features may share any of the characteristics attributed to either corresponding feature by the present disclosure. Moreover, user venue 260 and user 250, in FIG. 2, correspond respectively in general to user venue 160 and any of user(s) 150a, 150b, or 150c, in FIG. 1, and those corresponding features may share any of the characteristics attributed to either corresponding feature by the present disclosure. That is to say, although user venue 260 is shown to include indoor environment 262 according to the exemplary implementation shown in FIG. 2, more generally, user venue 160/260 may correspond to either an indoor or outdoor environment, as described above.

Camera 240 in FIG. 2 corresponds in general to camera 140 of mobile user system(s) 130a, 130b, and/or 130c in FIG. 1, and those corresponding features may share any of the characteristics attributed to either corresponding feature by the present disclosure. It is noted by reference to FIGS. 1 and 2 that camera 140/240 may assume a variety of forms. For example, as shown in FIG. 1, in some implementations, camera 140/240 may be integrated with mobile user system(s) 130a, 130b, and/or 130c.

Alternatively, and as shown in FIG. 2, camera 140/240 may be a discrete and self-contained image capture system capable of transmitting camera image 124/224 and/or optional sensor data 126/226 to augmented reality image generation system 100/200 via communication network 120/220. As yet another alternative, camera 140/240 may include a display corresponding to display 138 of mobile user system(s) 130a, 130b, and/or 130c, and as shown in FIG. 2, may be capable of receiving optional sensor data 126/226 and/or augmented reality image 128/228 via communication network 120/220.

It is noted that camera 140/240 may include a still image camera and/or a video camera. Moreover, in some implementations, camera 140/240 may take the form of a 360° camera, or an array of cameras configured to generate a 360° camera image. It is further noted that, as shown in FIG. 2, in some implementations, the camera image captured using camera 140/240 may be captured within indoor environment 262, i.e., indoors.

Figure 3:
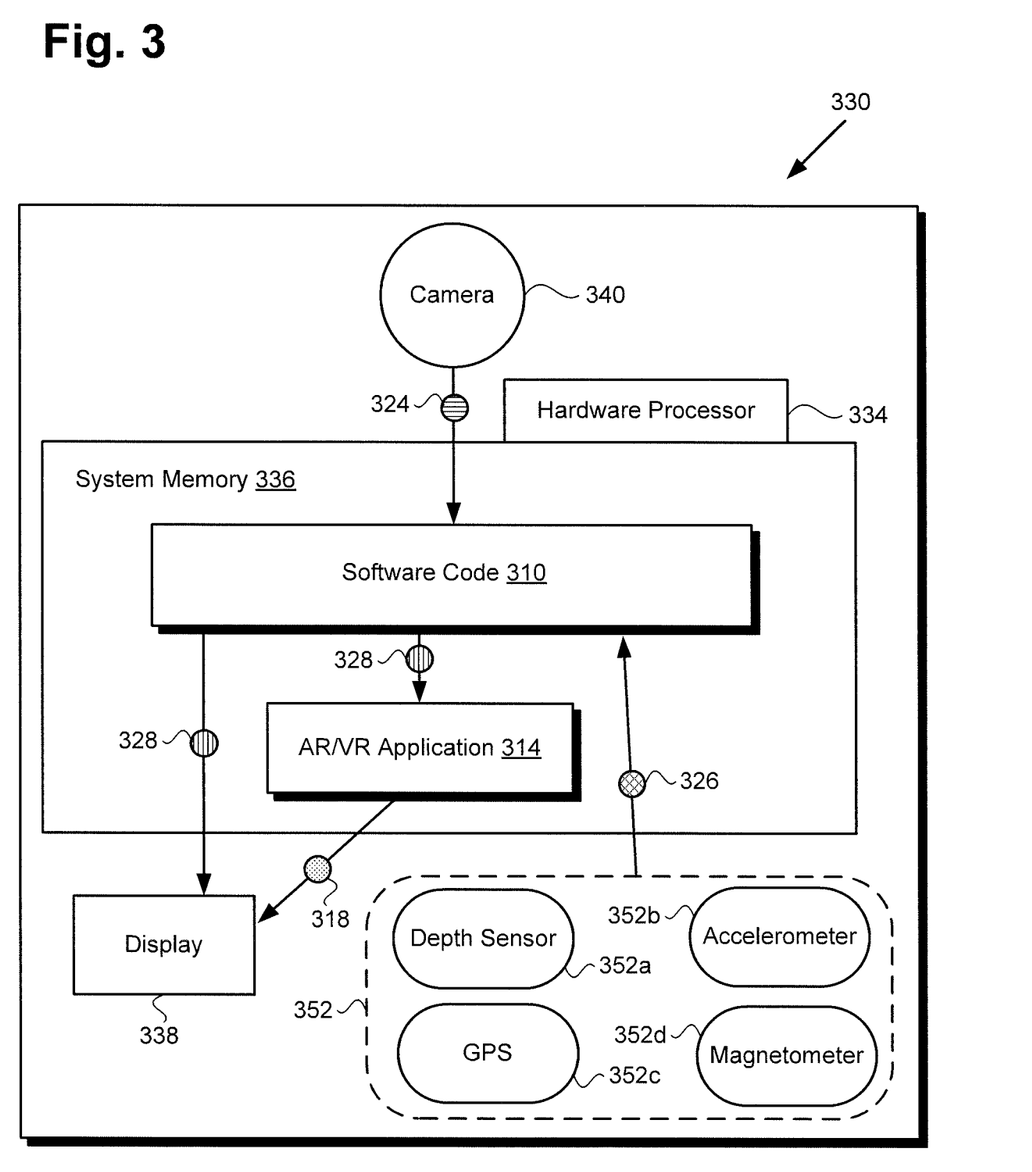
FIG. 3 shows a block diagram of a mobile user system, according to one implementation.

FIG. 3 shows a block diagram of mobile user system 330, according to one implementation. Mobile user system 330 includes user system hardware processor 334, user system memory 336 implemented as a non-transitory storage device, display 338, camera 340, and sensor(s) 352. As shown in FIG. 3, user system memory 336 stores software code 310 and may store AR or VR application 314 (hereinafter "AR/VR application 314"). As further shown in FIG. 3, sensor(s) 352 may include depth sensor 352a, accelerometer 352b, GPS receiver 352c, and/or magnetometer 352d. Also shown in FIG. 3 are camera image 324, sensor data 326, augmented reality image 328, and AR or VR user experience 318 provided by AR/VR application 314 using augmented reality image 328.

Mobile user system 330 including user system hardware processor 334, user system memory 336, display 338, camera 340, and sensor(s) 352 corresponds in general to any or all of mobile user system(s) 130a, 130b, and/or 130c, in FIG. 1, and those corresponding features may share any of the characteristics attributed to either corresponding feature by the present disclosure. Software code 310, in FIG. 3 corresponds in general to software code 110, in FIG. 1, and those corresponding features may share any of the characteristics attributed to either corresponding feature by the present disclosure.

In addition, camera image 324, sensor data 326, and augmented reality image 328, in FIG. 3, correspond respectively in general to camera image 124/224, sensor data 126/226, and augmented reality image 128/228, in FIGS. 1 and 2, and those corresponding features may share the characteristics attributed to any corresponding feature by the present disclosure. Moreover, camera 340, in FIG. 3, corresponds in general to camera 140/240, in FIGS. 1 and 2, and those corresponding features may share the characteristics attributed to any corresponding feature by the present disclosure. That is to say, in some implementations, camera 340, like camera 140/240, may include a still image camera and/or a video camera, may take the form of a 360° camera, or may include an array of cameras configured to generate a 360° camera image.

Figure 4:
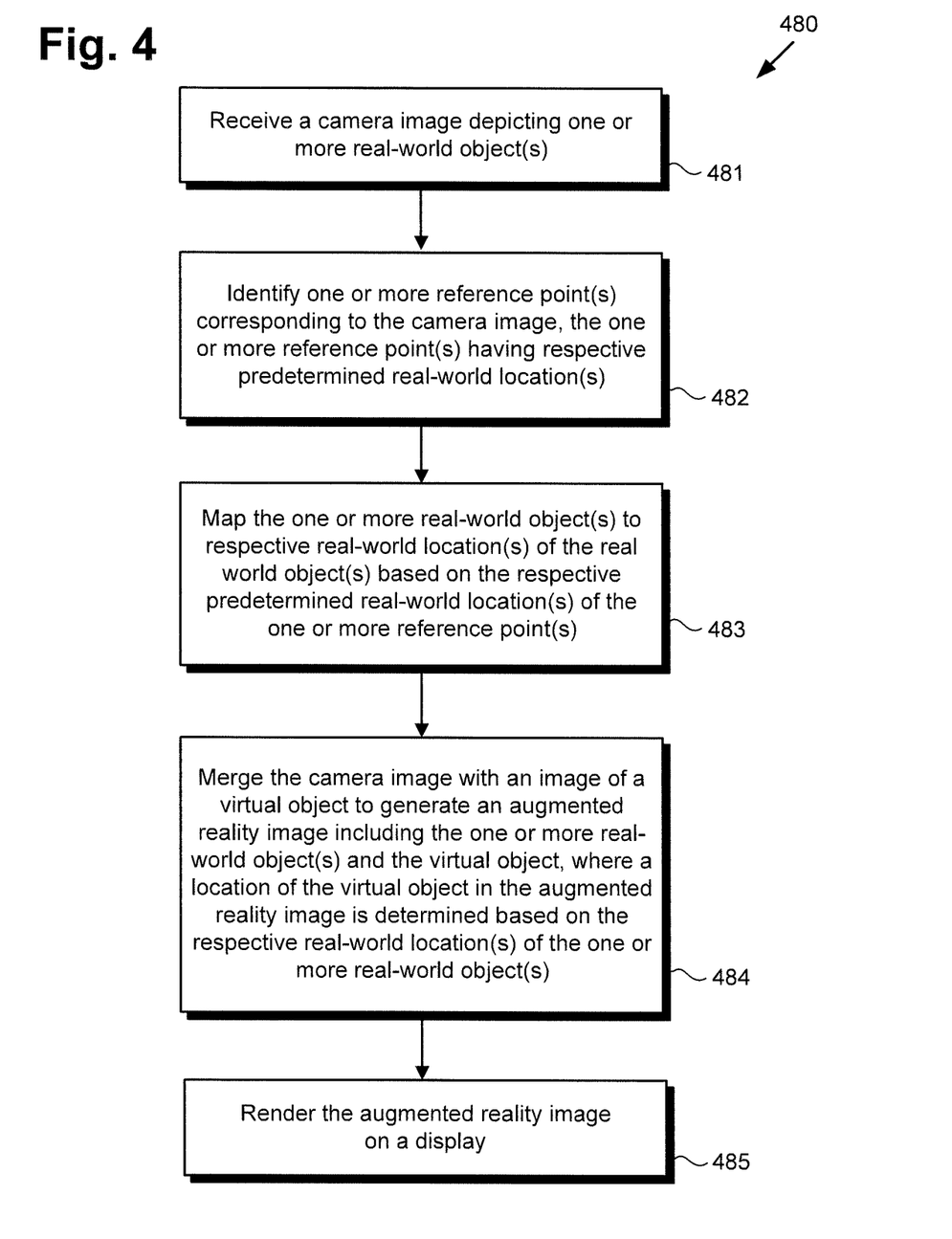
FIG. 4 shows a flowchart presenting an exemplary method for performing augmented reality image generation, according to one implementation.

The functionality of software code 110/310 will be further described by reference to FIG. 4 in combination with FIGS. 1, 2, and 3. FIG. 4 shows flowchart 480 presenting an exemplary method for performing augmented reality image generation, according to one implementation. With respect to the method outlined in FIG. 4, it is noted that certain details and features have been left out of flowchart 480 in order not to obscure the discussion of the inventive features in the present application.

Referring now to FIG. 4 in combination with FIGS. 1, 2, and 3, flowchart 480 begins with receiving camera image 124/224/324 depicting one or more real-world object(s) (action 481). Camera image 124/224/324 may be captured using camera 140/240/340, which, as stated above, may include a still image camera, video camera, 360° camera, or camera array. Camera image 124/224/324 may include one or more real-world object(s) situated within user venue 160/260. For example, camera image 124/224/324 may include one or more of floor 264, walls 266, and ceiling 268 of indoor environment 262. Alternatively, or in addition, camera image 124/224/324 may include real-world object 270 having surface 272.

In some implementations, user(s) 150a/150b/150c/250 may utilize mobile user system(s) 130a/130b/130c/330 or camera 240 to interact with augmented reality image generation system 100/200 in order to produce augmented reality image 128/228/328 including the one or more real-world objects captured by camera image 124/224/324. As shown by FIGS. 1 and 2, in some implementations, user(s) 150a/150b/150c/250 may do so by transmitting camera image 124/224/324 from mobile user system(s) 130a/130b/130c/330 or camera 240 to augmented reality image generation system 100/200 via communication network 120/220 and network communication links 122/222.

Alternatively, and as noted above, in some implementations, software code 110/310 may be stored on user system memory 136/336 and may be executed locally on mobile user system(s) 130a/130b/130c/330 by user system hardware processor 134/334. In those implementations, camera image 124/224/324 may be stored in user system memory 136/336. In various implementations, camera image 124/224/324 may be received by software code 110/310, executed by hardware processor 104 of computing platform 102, or by user system hardware processor 134/334 of mobile user system(s) 130a/130b/130c/330.

Flowchart 480 continues identifying one or more reference point(s) 258 corresponding to camera image 124/224/324, one or more reference point(s) 258 having respective predetermined real-world location(s) 254 (action 482). For example, in one implementation, camera image 124/224/324, may include real-world object 270 and may include data identifying reference point 258 corresponding to camera image 124/224/324. It is noted that although reference point 258 is identified in FIG. 2 using a single reference number, i.e., reference number 258, more generally, reference number 258 may represent more than one reference point corresponding to camera image 124/224/324, while reference number 254 may represent one or more predetermined real-world location(s) corresponding respectively to those reference point(s). For example, in one implementation reference point 258 may represent multiple reference points, such as three reference points for example, corresponding to camera image 124/224/324.

One or more reference point(s) 258 corresponding to camera image 124/224/324 and having respective predetermined real-world location(s) 254 may be identified by software code 110/310, executed by hardware processor 104 of computing platform 102, or by user system hardware processor 134/334 of mobile user system(s) 130a/130b/130c/330. For example, software code 110/310 may be configured to obtain reference point metadata, which can include metadata associated with other captured images or feeds, such as timestamps and location data. Software code 110/310 may be further configured to perform machine learning to identify common objects using image analysis. As a specific example, software code 110/310 may be configured to perform image analysis on camera image 124/224/324 to identify surfaces having respective predetermined real-world locations, such as floor 264, walls 266, and ceiling 268 within user venue 160/260, and/or surface 272 of real-world object 270.

It is noted that, in some implementations, the one or more real-world object(s) depicted by camera image 124/224/324, may serve as its/their own reference point(s) 258. For example, where user venue 160/260 is an outdoor venue, a real-world object such as a well-known or famous building, geographic feature, or other landmark may correspond uniquely to a predetermined real-world location. Specific examples of real-world objects encountered out-of-doors that can also serve as reference points include buildings such as the Empire State Building or White House, stadiums such as Wembley Stadium or the Rose Bowl, streets such as Wall Street in New York or Bourbon Street in New Orleans, or distinctive structures such as the Golden Gate Bridge or Seattle Space Needle, to name a few.

Alternatively, where user venue 160/260 is an indoor venue, any distinctive indoor feature, or a readily recognizable or famous object or configuration of objects such as a work of art, a museum exhibition, or the composition of objects arranged in an interior space, may serve as a reference point corresponding to camera image 124/224/324. Other examples of interior features that may serve as indoor reference points include windows, doors, furnishings, appliances, electronics equipment, or the layout of a hotel room, for instance.

Flowchart 480 continues with mapping the one or more real-world object(s) included in camera image 124/224/324 to respective real-world location(s) of the one or more real-world object(s) based on predetermined real-world location(s) 254 of the one or more reference point(s) 258 (action 483). In the interests of conceptual clarity, the actions outlined in flowchart 480 will be further described by reference to an exemplary use case focusing on real-world object 270 and virtual object 256. However, it is emphasized that, in many implementations, the present method may include mapping multiple real-world objects, e.g., floor 264, walls 266, and/or ceiling 268 of user venue 160/260 to their respective real-world locations.

Referring to FIG. 2, real-world object 270 having surface 272 may be mapped to real-world location 274 of real-world object 272 based on the respective predetermined real-world location(s) 254 of reference point(s) 258. That is to say, predetermined (i.e., known) real-world location(s) 254 of reference point(s) 258 can be utilized to map real-world object 270 included in camera image 124/224/324 to its real-world location 274, for example by estimation or determination of its linear and or angular displacement(s) from predetermined real-world location(s) 254. Mapping of real-world object 270 to its real-world location 274 may be performed by software code 110/310, executed by hardware processor 104 of computing platform 102, or by user system hardware processor 134/334 of mobile user system(s) 130a/130b/130c/330.

In some implementations, the method outlined by flowchart 480 may further include mapping real-world object 270 to its real-world location 274 based on sensor data 126/226/326, as well as on predetermined real-world location(s) 254 of reference point(s) 258. For example, as shown in FIG. 2, user venue 160/260 may include sensor(s) 252 and mobile user system(s) 130a/130b/130c/330 may include sensor(s) 352 providing sensor data 126/226/326 corresponding to real-world object 270. As noted above sensor(s) 252/352 may include one or more of depth sensor 352a, accelerometer 352b, GPS receiver 352c, and/or magnetometer 352d, to name a few examples. Thus, sensor data 126/226/326 may include one or more of depth sensor data, accelerometer data, GPS data, and magnetometer data, for example.

As further shown by FIGS. 1 and 2, in some implementations, sensor data 126/226/326 may be transmitted to one or more of augmented reality image generation system 100/200, mobile user system(s) 130a/130b/130c/330, and/or camera 240 via communication network 120/220 and network communication links 122/222. Alternatively, in some implementations, optional sensor(s) 252 may be integrated into mobile user system(s) 130a/130b/130c/330, and sensor data 126/226/326 may be stored in user system memory 136/336. In various implementations, sensor data 126/226/

326 may be received by software code 110/310, executed by hardware processor 104 of computing platform 102, or by user system hardware processor 134/334 of mobile user system(s) 130a/130b/130c/330, and may be utilized by software code 110/310 to map real-world object 270 to its real-world location 274.

Flowchart 480 continues with merging camera image 124/224/324 with virtual object 256 to generate augmented reality image 128/228/328 including real-world object 270 and virtual object 256, wherein a location of virtual object 256 in augmented reality image 128/228/328 is determined based on real-world location 274 of real-world object 270 (action 484). It is noted that mapping of real-world object(s) included in camera image 124/224/324 to their real-world locations in action 483 advantageously enables appropriate and realistic placement of virtual objects, such as virtual object 256 into augmented reality image 128/228/328.

For example, and as shown in FIG. 2, in use cases in which real-world object 270 provides surface 272 and an appropriate and realistic location for virtual object 256 is for virtual object 256 to be resting on surface 272, the present method enables accurate placement of virtual object 256 on surface 272, rather than partially through surface 272 or appearing to levitate in space adjacent to surface 272 as may readily occur in the conventional art. Virtual object 256 may be selected from virtual object library 112, either through an automated process performed by software code 110/310, or in response to one or more selection inputs to mobile user system(s) 130a/130b/130c/330 and/or augmented reality image generation system 100/200 provided by user(s) 150a/150b/150c/250. Merging of camera image 124/224/324 with virtual object 256 to generate augmented reality image 128/228/328 may be performed by software code 110/310, executed by hardware processor 104 of computing platform 102, or by user system hardware processor 134/334 of mobile user system(s) 130a/130b/130c/330.

In some implementations, flowchart 480 can conclude with rendering augmented reality image 128/228/328, on a display, such as display 108 of augmented reality image generation system 100/200 or display 138/338 of mobile user system(s) 130a/130b/130c/330 (action 485). As noted above, in some implementations, camera 140/240/340 may take the form of a 360° camera, or an array of cameras configured to generate a 360° camera image. In those implementations, for example, augmented reality image 128/228/328 may be rendered as a 360° image. The rendering of augmented reality image 128/228/328 on display 108 or display 138/338 may be performed by software code 110/310, executed respectively by hardware processor 104 of computing platform 102 or by user system hardware processor 134/334.

Thus, the present application discloses an augmented reality image generation solution. In one implementation, by identifying one or more reference point(s) having respective predetermined real-world location(s) and corresponding to a camera image, the present solution enables mapping of one or more real-world object(s) depicted in the camera image to their respective real-world location(s). As a result, in one implementation, the present solution advantageously enables merging the camera image with an image of a virtual object. The merger generates an augmented reality image including the real-world object(s) and the virtual image, such that an appropriate location of the virtual object in the augmented reality image is determined based on the real-world location(s) of the real-world object(s). The present solution may further include rendering the augmented reality image on a display.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An augmented reality image generation system comprising:
   a computing platform including a hardware processor and a system memory;
   a software code stored in the system memory;
   a display communicatively coupled to the computing platform;
   the hardware processor configured to execute the software code to:
      obtain a reference point metadata associated with a first camera image, the reference point metadata including a timestamp associated with the first camera image;
      receive a second camera image depicting at least one real-world object;
      identify at least one reference point depicted in the second camera image based on the reference point metadata including the timestamp associated with the first camera image, the at least one reference point having a predetermined real-world location, the at least one reference point is separate from the at least one real-world object;
      map the at least one real-world object to a real-world location of the at least one real-world object based on the predetermined real-world location of the at least one reference point;
      merge the second camera image with a virtual object to generate an augmented reality image including the at least one real-world object and the virtual object, wherein a location of the virtual object in the augmented reality image is determined based on the real-world location of the at least one real-world object; and
      render the augmented reality image on the display.

2. The augmented reality image generation system of claim 1, wherein the augmented reality image is rendered as a three-hundred-and-sixty degree (360°) image.

3. The augmented reality image generation system of claim 1, wherein identifying the at least one reference point depicted in the second camera image further comprises performing an image analysis of the second camera image.

4. The augmented reality image generation system of claim 3, wherein the hardware processor is further configured to execute the software code to:
   receive a sensor data corresponding to the at least one real-world object; and
   map the at least one real-world object to the real-world location of the at least one real-world object based on the predetermined real-world location of the at least one reference point and the sensor data.

5. The augmented reality image generation system of claim 1, wherein the second camera image is captured indoors.

6. The augmented reality image generation system of claim 1, wherein the hardware processor is further configured to execute the software code to:
receive a sensor data corresponding to the at least one real-world object; and
map the at least one real-world object to the real-world location of the at least one real-world object based on the predetermined real-world location of the at least one reference point and the sensor data.

7. The augmented reality image generation system of claim 6, wherein the sensor data comprises at least one of depth sensor data, accelerometer data, or magnetometer data.

8. A method for use by an augmented reality image generation system including a computing platform having a hardware processor, a system memory storing a software code, and a display, the method comprising:
obtaining, using the hardware processor, a reference point metadata associated with a first camera image, the reference point metadata including a timestamp associated with the first camera image;
receiving, using the hardware processor, a second camera image depicting at least one real-world object;
identifying, using the hardware processor, at least one reference point depicted in the second camera image based on the reference point metadata including the timestamp associated with the first camera image, the at least one reference point having a predetermined real-world location, the at least one reference point is separate from the at least one real-world object;
mapping, using the hardware processor, the at least one real-world object to a real-world location of the at least one real-world object based on the predetermined real-world location of the at least one reference point;
merging, using the hardware processor, the second camera image with a virtual object to generate an augmented reality image including the at least one real-world object and the virtual object, wherein a location of the virtual object in the augmented reality image is determined based on the real-world location of the at least one real-world object; and
rendering, using the hardware processor, the augmented reality image on the display.

9. The method of claim 8, wherein the augmented reality image is rendered as a three-hundred-and-sixty degree (360°) image.

10. The method of claim 8, wherein identifying the at least one reference point depicted in the second camera image further comprises performing an image analysis of the second camera image.

11. The method of claim 8, wherein the second camera image is captured indoors.

12. The method of claim 8, further comprising:
receiving, using the hardware processor, a sensor data corresponding to the at least one real-world object; and
mapping, using the hardware processor, the at least one real-world object to the real-world location of the at least one real-world object based on the predetermined real-world location of the at least one reference point and the sensor data.

13. The method of claim 12, wherein the sensor data comprises at least one of depth sensor data, accelerometer data, or magnetometer data.

14. A mobile user system comprising:
a hardware processor, a system memory, a display, and a camera;
a software code stored in the system memory;
the hardware processor configured to execute the software code to:
obtain a reference point metadata associated with a first camera image, the reference point metadata including a timestamp associated with the first camera image;
receive a second camera image from the camera, the second camera image depicting at least one real-world object;
identify at least one reference point depicted in the second camera image based on the reference point metadata including the timestamp associated with the first camera image, the at least one reference point having a predetermined real-world location, the at least one reference point is separate from the at least one real-world object;
map the at least one real-world object to a real-world location of the at least one real-world object based on the predetermined real-world location of the at least one reference point;
merge the second camera image with a virtual object to generate an augmented reality image including the at least one real-world object and the virtual object, wherein a location of the virtual object in the augmented reality image is determined based on the real-world location of the at least one real-world object; and
render the augmented reality image on the display.

15. The mobile user system of claim 14, wherein the augmented reality image is rendered as a three-hundred-and-sixty degree (360°) image.

16. The mobile user system of claim 14, wherein the hardware processor is configured to execute the software code to identify the at least one reference point depicted in the second camera image further by performing an image analysis of the second camera image.

17. The mobile user system of claim 14, wherein the second camera image is captured indoors by the camera.

18. The mobile user system of claim 14, wherein the mobile user system is one of a smartphone, a tablet computer, or a head-mounted viewing device.

19. The mobile user system of claim 14, wherein the hardware processor is further configured to execute the software code to:
receive a sensor data corresponding to the at least one real-world object; and
map the at least one real-world object to the real-world location of the at least one real-world object based on the predetermined real-world location of the at least one reference point and the sensor data.

20. The mobile user system of claim 19, wherein the sensor data comprises at least one of depth sensor data, accelerometer data, or magnetometer data.

* * * * *